(12) United States Patent
Picciotto et al.

(10) Patent No.: US 10,291,719 B2
(45) Date of Patent: May 14, 2019

(54) ENABLING COMMUNICATION WHILE LIMITING ACCESS TO USER INFORMATION

(71) Applicant: Google Inc., Mountain View, CA (US)

(72) Inventors: NeilFred Picciotto, Santa Clara, CA (US); Roderick Adonis Chavez, Bellevue, WA (US); Sean Edward Purcell, San Francisco, CA (US)

(73) Assignee: Google LLC, Mountain View, CA (US)

( * ) Notice: Subject to any disclaimer, the term of this patent is extended or adjusted under 35 U.S.C. 154(b) by 232 days.

(21) Appl. No.: 15/299,833

(22) Filed: Oct. 21, 2016

(65) Prior Publication Data

US 2017/0126811 A1 May 4, 2017

Related U.S. Application Data

(60) Provisional application No. 62/248,241, filed on Oct. 29, 2015.

(51) Int. Cl.
*G06F 15/16* (2006.01)
*H04L 29/08* (2006.01)
(Continued)

(52) U.S. Cl.
CPC ............ *H04L 67/141* (2013.01); *H04L 51/28* (2013.01); *H04L 61/3015* (2013.01); *H04L 63/102* (2013.01); *H04L 63/105* (2013.01); *H04L 67/20* (2013.01); *H04L 67/36* (2013.01); *G06Q 50/01* (2013.01); *H04L 51/04* (2013.01); *H04L 63/108* (2013.01); *H04L 67/306* (2013.01)

(58) Field of Classification Search
CPC ....... H04L 67/141; H04L 67/20; H04L 67/36; H04L 63/102; H04L 63/105; H04L 61/3015; H04L 51/28; H04L 51/04

USPC ........................................................ 709/228
See application file for complete search history.

(56) References Cited

U.S. PATENT DOCUMENTS

| 8,646,060 B1 * | 2/2014 | Ben Ayed ........... H04L 63/0853 726/9 |
| 9,980,140 B1 * | 5/2018 | Spencer ................ H04W 12/06 |
| 2014/0229544 A1 | 8/2014 | Evans et al. |

FOREIGN PATENT DOCUMENTS

WO 2012/035149 3/2012

OTHER PUBLICATIONS

International Report and Written Opinion for International Application No. PCT/US2016/058250, dated Jan. 26, 2017, 13 pgs.
(Continued)

*Primary Examiner* — Kristie D Shingles
(74) *Attorney, Agent, or Firm* — Patent Law Works LLP

(57) ABSTRACT

A system comprising a processor and a memory storing instructions that, when executed, cause the system to create a first identifier associated with a first user and including profile information of the first user; determine a second identifier associated with the first user and with an application, the second identifier including a subset of the profile information of the first user; receive an interaction request from a second user, the interaction request including a third identifier associated with the first user; associate the third identifier with the first identifier associated with the first user and the application; enable the interaction between the first user and the second user on the application; and provide for display to the second user information associated with the first user based on the second identifier.

20 Claims, 5 Drawing Sheets

(51) Int. Cl.
*H04L 29/06* (2006.01)
*H04L 29/12* (2006.01)
*H04L 12/58* (2006.01)
*G06Q 50/00* (2012.01)

(56) References Cited

OTHER PUBLICATIONS

King, Jennifer, et al., "Privacy: Is There an App for That?" Usable Privacy and Security, ACM, Jul. 20, 2011, pp. 1-20.

* cited by examiner

ENABLING COMMUNICATION WHILE LIMITING ACCESS TO USER INFORMATION

CROSS-REFERENCE TO RELATED APPLICATIONS

The present application claims priority, under 35 U.S.C. § 119, to U.S. Provisional Patent Application No. 62/248,241, filed Oct. 29, 2015 entitled "Enabling Communication While Limiting Access to User Information," which is incorporated by reference in its entirety.

BACKGROUND

The disclosure relates to providing discoverability and reachability through granular controls. Specifically, the disclosure relates to enabling communication while limiting access to user information.

Users value their privacy and protection of their personal information. Further, users of Internet specific applications and mobile applications value some control over their personal information or a degree of accessibility to other users to their personal information. Therefore, as technology in end-user applications has been advancing, privacy has also been fading. In particular, Internet user-specific applications and other types of applications offered to end-users fail to provide a means of communication between two or more end-users without having to share personal information with the other end-user.

SUMMARY

According to one innovative aspect of the subject matter in this disclosure, a system having one or more processors and a memory storing instructions that, when executed, cause the system to: create a first identifier associated with a first user and referencing profile information of the first user; determine a second identifier associated with the first user and with an application, the second identifier referencing a subset of the profile information of the first user; receive an interaction request from a second user, the interaction request including a third identifier associated with the first user; associate the third identifier with the first identifier associated with the first user and the application; enable the interaction between the first user and the second user on the application; and provide for display to the second user information associated with the first user based on the second identifier.

In general, another innovative aspect of the subject matter described in this disclosure may be implemented in methods that include: creating a first identifier associated with a first user and referencing profile information of the first user; determining a second identifier associated with the first user and with an application, the second identifier referencing a subset of the profile information of the first user; receiving an interaction request from a second user, the interaction request including a third identifier associated with the first user; associating the third identifier with the first identifier associated with the first user and the application; enabling the interaction between the first user and the second user on the application; and providing for display to the second user information associated with the first user based on the second identifier.

Other implementations of one or more of these aspects include corresponding systems, apparatus, and computer programs, configured to perform the actions of the methods, encoded on computer storage devices.

These and other implementations may each optionally include one or more of the following features.

For instance, the operations further include: determining a type of the second user; determining whether the type of the second user matches a type of the first user; providing for display to the second user information associated with the first user based on a fourth identifier; enabling an interaction between the first user and the second user; providing an identifier-modification option to the first user during the interaction with the second user after a predetermined length of time; receiving a confirmation from the first user for the identifier-modification option; updating the information of the first user based on the identifier-modification option; providing the updated information of the first user for display to the second user during the interaction; generating a list of applications indicating reachability of the first user based on the first identifier; and providing for display to the second user the list of applications indicating reachability of the first user, the list of applications including a limited display of information associated with the first user based on the second identifier.

For instance, the features may include that the first identifier references a phone number associated with the second user; that the information associated with the first user is displayed to the second user during an interaction session with the first user; that the information associated with the first user may include at least one from the group of an age, a geographical location, a profile photo, a phone number, a work information, an education, a friend of the first user, a browsed content, a registered application, a group joined by the first user; and that the fourth identifier references an alias associated with a group that the first user has joined.

These implementations are particularly advantageous in a number of respects. For instance, the technology describes herein can be used for enabling reachability and discoverability of a user through granular controls available to the user, while limiting display of sensitive information associated with the user to other users.

It should be understood that language used in the present disclosure has been principally selected for readability and instructional purposes, and not to limit the scope of the subject matter disclosed herein.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

One technical problem with internet and network technologies is protecting and keeping private the personal information of user. Another problem is allowing the user to control what information remains private and protected and what information does not. Many prior art system allow, have no controls whatsoever that the user can modify to protect and keep their personal information private.

Systems and methods for providing discoverability and reachability through granular controls are disclosed. Reachability allows a user to be reached by other users without having to share personal information with the other users. Discoverability is about exposing personal information to others. For example, the user's profile may be associated with a first identifier (e.g. phone number, e-mail address, nickname, etc.). The user may indicate certain personal information to share with the other users by means of a second identifier associated with the user's profile. In some implementations, the second identifier may be associated with one or more handles or nicknames designated by the user. The one or more handles may be individual aliases (e.g. unique identifiers) of the user in association with one or more applications. For example, a first handle may be specific to gaming applications and other users may interact with the user through the gaming application.

In some implementations, the other users may be provided a general list of applications indicating reachability of the user. For example, the list of applications may be indicative that the user is reachable on a business application but not on an alternate application (e.g. social-network application). The other users may then be provided the user's personal information on the business application based on the second identifier.

Figure 1:
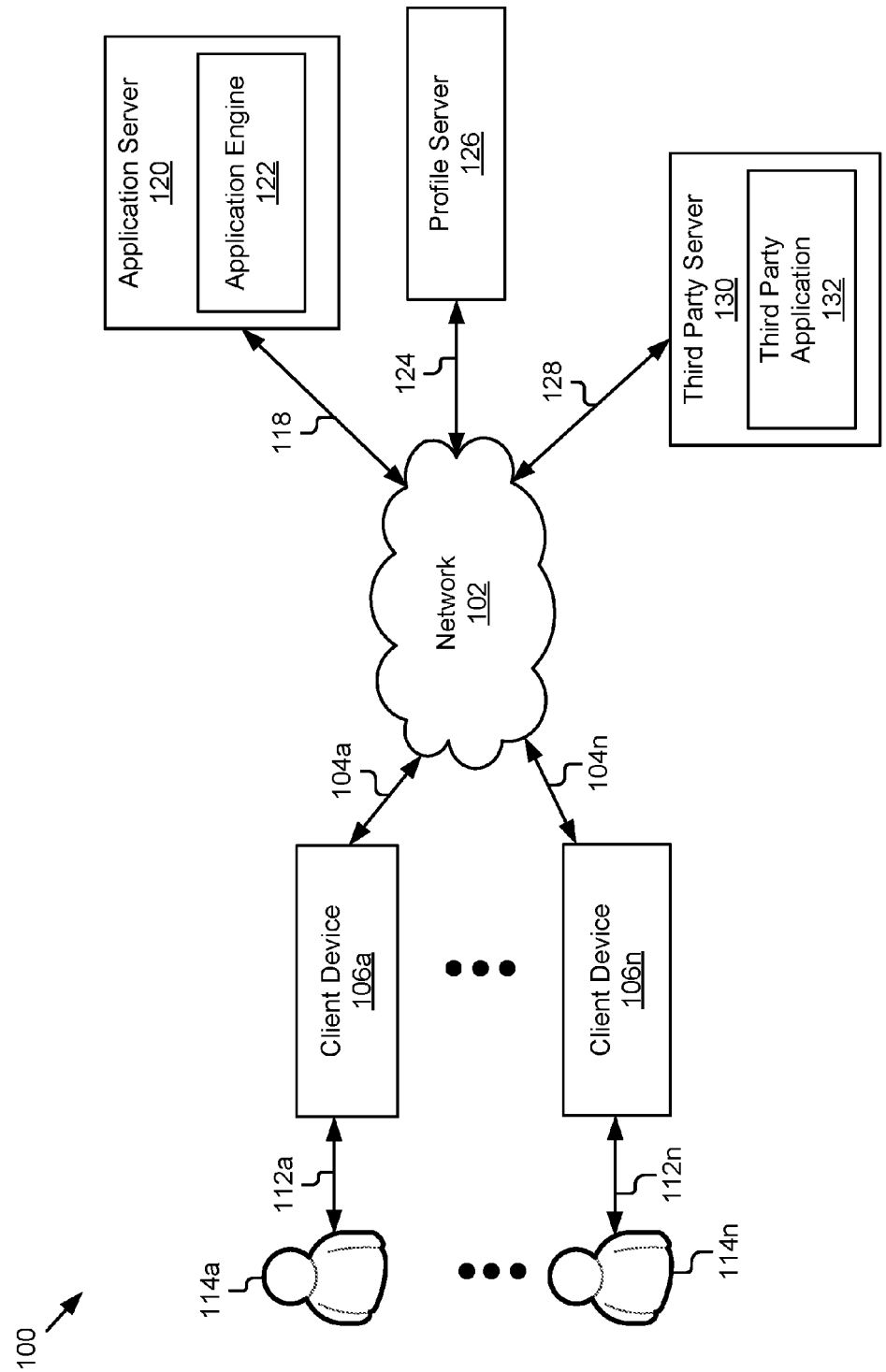
FIG. 1 is a block diagram illustrating an example system for enabling an interaction between users and providing limited user information during the interaction.

FIG. 1 is a block diagram illustrating an example system for enabling an interaction between users and providing limited user information during the interaction. In the depicted implementation, the system 100 may include client devices 106a through 106n, an application server 120, a profile server 126, and a third party server 130. In the illustrated implementations, these entities of the system 100 are communicatively coupled via network 102. However, the present disclosure is not limited to this configuration and a variety of different system environments and configurations may be employed and are within the scope of the present disclosure. Other implementations may include additional or fewer computing devices, services, and/or networks.

It should be recognized that FIG. 1 as well as the other figures used to illustrate an implementation, an indication of a letter after a reference number or numeral, for example, "106a" is a specific reference to the element or component that is designated by that particular reference numeral. In the event a reference numeral appears in the text without a letter following it, for example, "106," it should be recognized that such is a general reference to different implementations of the element or component bearing that general reference numeral.

In some implementations, the entities of the system 100 may use a cloud-based architecture where one or more computer functions or routines are performed by remote computing systems and devices at the request of a local computing device. For example, a client device 106 may be a computing device having hardware and/or software resources and may access hardware and/or software resources provided across the network 102 by other computing devices and resources, including, for instance, other user devices 106, the application server 120, the profile server 126, and/or the third party server 130, or any other entities of the system 100.

The network 102 may be a conventional type, wired or wireless, and may have numerous different configurations including a star configuration, token ring configuration, or other configurations. Furthermore, the network 102 may include a local area network (LAN), a wide area network (WAN) (e.g., the Internet), and/or other interconnected data paths across which multiple devices may communicate. In some implementations, the network 102 may be a peer-to-peer network. The network 102 may also, be coupled to or includes portions of a telecommunications network for sending data in a variety of different communication protocols. In some implementations, the network 102 includes Bluetooth™ communication networks or a cellular communications network for sending and receiving data including via short messaging service (SMS), multimedia messaging service (MMS), hypertext transfer protocol (HTTP), direct data connection, WAP, email, etc. In addition, although FIG. 1 illustrates a single network 102 coupled to the client devices 106, the application server 120, profile server 126, and third party server 130 that are illustrated, in practice, one or more networks 102 may be connected to these entities.

In some implementations, the client devices 106 (any or all of 106a through 106n) are computing devices having data processing and data communication capabilities. In the illustrated implementation, the users 114a through 114n interact with the client devices 106a and 106n, via signal lines 112a and 112n, respectively. The client devices 106a through 106n are communicatively coupled to the network 102 via signal lines 104a through 104n respectively. Although two client devices 106 are illustrated, the disclosure applies to a system architecture having any number of client devices 106 available to any number of users 114.

In some implementations, a client device 106 includes a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks (e.g., the Internet), and executing software routines to provide enhanced functionality and interactivity to viewers, or the like. In some implementations, the client device 106 may be a handheld wireless computing device which may be capable of sending and receiving voice and/or data communications.

The client device 106 may include a computer processor, a memory, a power source, and a communication unit including one or more network interfaces for interacting with the network 102, including, for example, wireless transceivers to broadcast and receive network data via radio signals. The client device 106 may also include one or more of a graphics processor; a high-resolution touchscreen; a physical keyboard; forward and rear facing cameras; a Bluetooth® module; memory storing applicable firmware; and various physical connection interfaces (e.g., USB, HDMI, headset jack, etc.); etc.

Additionally, an operating system for managing the hardware and resources of the client device 106, application programming interfaces (APIs) for providing applications access to the hardware and resources, a user interaction module for generating and displaying interfaces for user interaction and input, and applications including, for example, applications for web browsing, instant messaging with one or more other users through internet applications, and/or real-time video communication applications, etc., may be stored and operable on the client device 106. While FIG. 1 illustrates two or more client devices 106, the present disclosure applies to any system architecture having any number of client devices 106.

In some implementations, the client devices 106a through 106n contain a user application (not shown) and executable by a processor (not shown) of the client device 106 to provide for user interaction, and to send and receive data via the network 102. In particular, the user application can be operable to instruct the client device 106 to render user interfaces, receive user input, and send information to and receive information from the application server 120, and the other entities of the system 100. In these or other implementations, the user application (not shown) may be stored in memory (not shown) of the client device 106 and is accessible and executable by a processor (not shown).

The application server 120 can be a hardware server that includes a processor (not shown), a memory (not shown), and network communication capabilities. The application server 120 is coupled to the network 102 via signal line 118 for communication and cooperation with the other components of the system 100. In some implementations, the application server 120 sends and receives data to and from one or more of the client devices 106a, 106n and/or the profile server 126, and the third party server 130 via the network 102. Although one application server is shown, persons of ordinary skill in the art will recognize that multiple servers can be utilized, either in a distributed architecture or otherwise. For the purpose of this application, the system configuration and operations performed by the system are described in the context of a single application server 120.

In some implementations, the application server 120 may include an application engine 122 for creating and mapping one or more identifiers. The application engine 122, in some implementations, can be a network-based software service operable to provide the computing functionalities, services, and/or resources to send data to and receive data from other entities of the network 102. For example, the application engine 122 can provide users 114 with a service for Internet searching; electronic messaging; blogging; online gaming; multimedia hosting; sharing; business services; news and media consumption or any combination of the foregoing services. In some embodiments, the application engine 122 may map a phone number to a user profile hosted on the profile server 126. It should be understood that the application engine 122 is not limited to providing the above-noted services and may provide any other client or network-based service.

The profile server 126 can be a computing device that includes a processor (not shown), a memory (not shown), and network communication capabilities. The profile server 126 is coupled to the network 102 via signal line 124. In some implementations, the profile server 126 sends and receives data to and from the client device 106, the application server 120, and third party server 130 via the network 102. For instance, in some implementations, the profile server 126 stores and/or hosts profiles for a main account associated with users. Although only one profile server 126 is shown, persons of ordinary skill in the art will recognize that multiple servers can be present.

The third party server 130 includes one or more computing devices or systems for providing various computing functionalities, services, and/or resources to the other entities of the systems 100. In some implementations, the third party server 130 hosts a network-based software application (e.g., a third-party application 132) operable to provide computing functionalities, services and/or resources or functionalities, and to send data to and receive data from the other entities of the systems 100. In some implementations, the third party server 130 is a server, server array or any other computing device, or group of computing devices, having data processing, storing and communication capabilities. Examples of the types of software services that the third party server 130 may provide, but is not limited to, include third-party online gaming applications; internet searching; social networking; web-based email; blogging; micro-blogging; multimedia hosting, distribution, and sharing; business services; news and media distribution; or any combination of the foregoing services. It should be understood that the third party server 130 are not limited to providing the above-noted services and may include any other network-based or cloud-based service. The third party server 130 runs or host various applications some of which may be third party and could be related to the profile hosted on the profile server 126.

Figure 2:
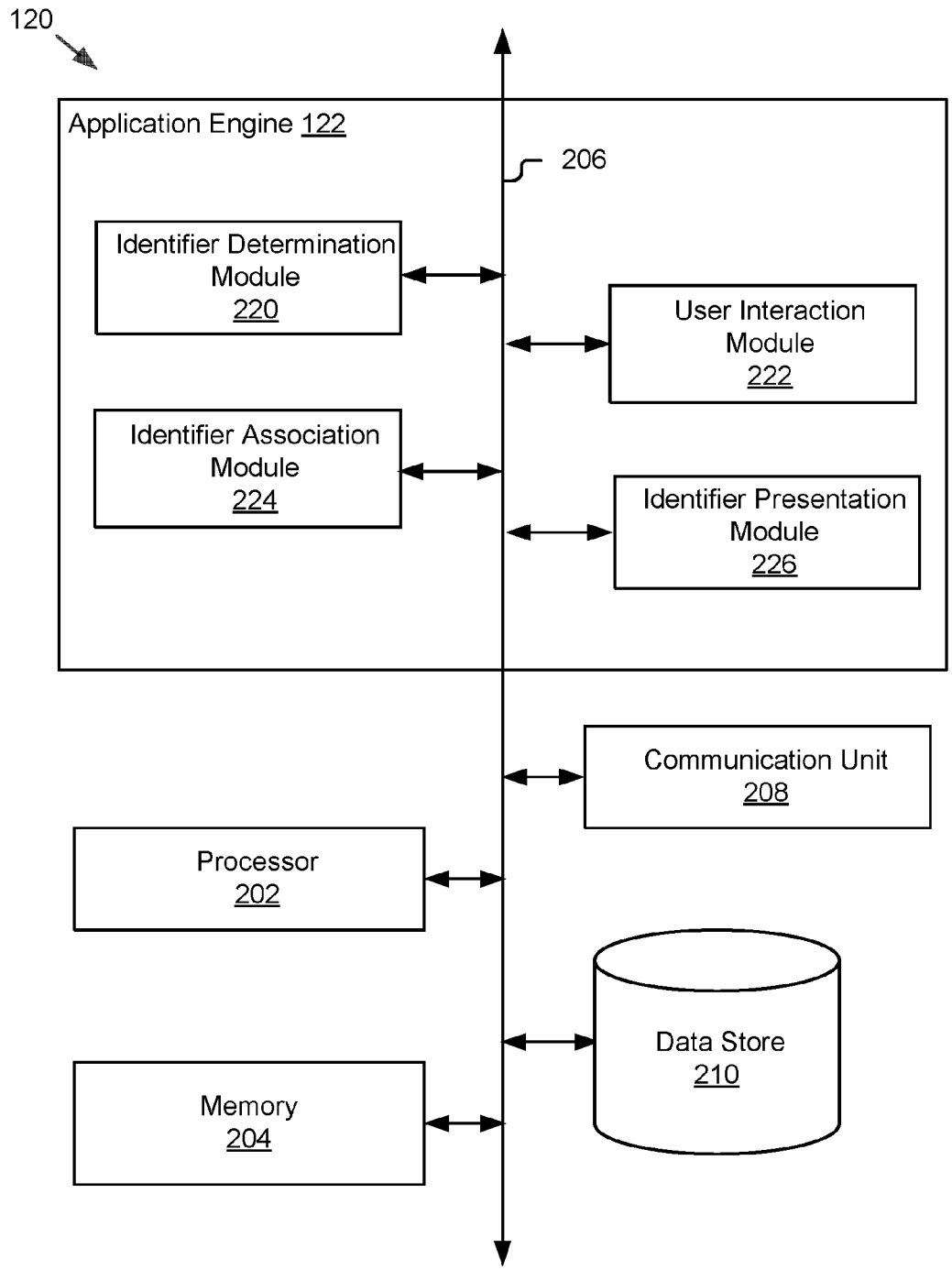
FIG. 2 is a block diagram illustrating an example application server.

Referring now to FIG. 2, an example of an application server is shown in more detail. FIG. 2 is a block diagram illustrating an example application server. As depicted, the application server 120 may include the application engine 122, a processor 202, a memory 204, a communication unit 208, and a data store 210, which may be communicatively coupled by a communication bus 206. It should be understood that the above configurations are provided by way of example and numerous further configurations are contemplated and possible.

The application engine 122 is software, code, logic, or routines for creating and mapping one or more identifiers. The identifiers may be mapped directly or indirectly as described below. As depicted in FIG. 2, the application engine 122 may include an identifier determination module 220, a user interaction module 222, an identifier association module 224, and an identifier presentation module 226.

In some implementations, the components 220, 222, 224, and/or 226 are electronically communicatively coupled for cooperation and communication with each other, the processor 202, the memory 204, the communication unit 208, and/or the data store 210. These components, 220, 222, 224, and 226 are also coupled for communication with the other entities (e.g. user device 106) of the system 100 via the network 102.

In some implementations, the identifier determination module 220, the user interaction module 222, the identifier association module 224, and the identifier presentation module 226 are sets of instructions executable by the processor 202, or logic included in one or more customized processors, to provide their respective functionalities. In some implementations, the identifier determination module 220, the user interaction module 222, the identifier association module 224, and the identifier presentation module 226 are stored in the memory 204 of the application server 120 and are accessible and executable by the processor 202 to provide their respective functionalities. In any of these implementations, the identifier determination module 220, the user interaction module 222, the identifier association module 224, and the identifier presentation module 226 are adapted for cooperation and communication with the processor 202 and other components of the application server 120.

The identifier determination module 220 is software, code, logic, or routines for generating identifiers associated with users. In some implementations, the identifier determination module 220 in cooperation with the profile server 126 can be configured to create one or more identifiers associated with a user and a profile of the user. For instance, the identifier module 220 may receive a user identifier registration input from user 114 via client device 106; the identifier determination module 220 in cooperation with the profile server 126 can then register an identifier (e.g. first identifier) that can be associated with a user and a profile of the user.

In some implementations, the identifier determination module 220 receives an identifier registration request for a particular application accessed on the client device 106 and associated with a user. A particular application may include, but is not limited to, business applications, education, entertainment, gaming, health and fitness, news, photo and video, travel, sports, etc. In some implementations, an identifier registration request may include a timeframe requirement associated with the particular application for a user to register an identifier with the particular application. For instance, if a user fails to submit a request for creating an identifier associated with a particular application within a timeframe, the identifier determination module 220 in cooperation with one or more of the other entities of system 100, may restrict the user from being reachable in the particular application (e.g. health and fitness application). In some implementations, an identifier may reference information associated with the user, for example, but is not limited to, a type for the user, age, geographic location, profile photo, phone number, work information, education, friends of the user, browsed content, registered applications, groups joined by the user, etc.

In some implementations, a user may request an identifier registration for a phone number. The identifier determination module 220 in cooperation with the profile server 126 may then map the phone number of the user with a profile (e.g. social network profile, on-line gaming profile, etc.) associated with the user. In some implementations, the identifier determination module 220 transmits the identifier associated with the identifier registration request to the identifier presentation module 226, the identifier presentation module 226 may then provide for display information (e.g. reachability) of the user associated with the identifier (e.g. first identifier) to other users, as discussed in more detail elsewhere herein.

In some implementations, the identifier determination module 220 receives a user request for determining a conditional identifier (e.g. second identifier). The conditional identifier can be an addition to an identifier (e.g. first identifier) that was created based on the user identifier registration input. In some implementations, the conditional identifier may be determined based on a request from a user to reference or include a subset of information (e.g. limited information) associated with a profile of the user. A user may indicate that a subset of sensitive personal information be shared with other users by means of the conditional identifier. For instance, a first user may desire that a second user external to a personal network of the first user be presented limited information (e.g. first name, age, and reachability only) associated with the first user via the conditional identifier. However, other users that are part of the personal network of the first user may be presented non-limiting information (e.g. complete profile information of the first user) using the identifier (e.g. first identifier) associated with the initial identifier registration.

The identifier determination module 220 can also, generate a list of applications indicating reachability of a user based on an identifier. The reachability of the user on one or more applications in the list of applications may be based on one or more independent identifiers. For example, a user may request that one or more independent identifiers each referencing or including a separate alias which the identifier determination module 220 may then assign the one or more independent identifiers to their respective application based on a user specification input. In some implementations, the identifier determination module 220 in cooperation with the identifier presentation module 226 and/or third party server 226 provide for display to other users the list of applications indicating reachability of the first user based on the one or more independent identifiers. The list of applications indicating reachability of the first user may include, but is not limited to, a limited display of information associated with the first user based on the conditional identifier. The limited display of information may include, the subset of information associated with the profile of the first user, as discussed elsewhere herein.

In further implementations, the identifier determination module 220 may determine a conditional identifier (e.g. second identifier) associated with one or more handles designated by a user. The one or more handles may be individual alias (e.g. unique identifiers, independent identifiers) of the user in association with one or more applications. In some implementations, a first handle may be specific to gaming applications and other users may interact with the user through the gaming application. For example, a first handle may identify the user as WarLord123 to other users on a gaming application; whereas, a second handle may be specific to business contacts of the user on a business application and identify the user as Dr. Kevin Smith. The identifier determination module 220 in cooperation with one or more other entities of system 100 (e.g. identifier association module 224 and/or identifier presentation module 226) may then determine and provide different information (e.g. limited information vs. non-limiting information) about the user (Dr. Kevin Smith) to one set of users that interact with the user WarLord123 (Dr. Kevin Smith) on the gaming application as compared to a second set of users that interact with the user (Dr. Kevin Smith) on the business application.

In some implementations, the identifier determination module 220 may send the identifier (e.g. first identifier) based on the identifier registration input and/or the conditional identifier to the user interaction module 222 and/or the identifier association module 224, which may then use those inputs to perform its acts and/or functionalities thereon.

The user interaction module 222 is software, code, logic, or routines for receiving an interaction request between two or more users. In some implementations, the user interaction module 222 receives an interaction request associated with an interaction-identifier (e.g. third identifier) from a user. The interaction-identifier (e.g. third identifier) may be associated with a first user and an application. An interaction-identifier (e.g. third identifier) may reference a phone number, e-mail address, and/or alias associated with a first user for one or more applications. For example, a second user may submit a search to a search engine (not shown), the search may include the interaction-identifier (e.g., third identifier) associated with a first user. The search engine (not shown) may then provide a search result that displays one or more users associated with the interaction-identifier and one or more applications to the second user, the user interaction module 222 may then receive a request from the second user for interacting with the first user on one of the one or more applications. A search result, may include, but is not limited to, one or more applications indicating reachability of a user. In some implementations, the search result may include a subset of applications associated with the interaction-identifier. For example, a user may assign that only the subset of applications that are associated with the interaction-identifier are visible in the search result (e.g. reachability result).

In some implementations, the user interaction module 222 processes an interaction between a first user and a second user and an interaction period associated with the interaction. An interaction period may include, but is not limited to, an ongoing (e.g. pending) interaction. In some implementations, the second user is provided for display information about the first user during the interaction via the identifier presentation module 226. The displayed information about the first user may be associated with a second identifier. In some implementations, the user interaction module 222 may provide an identifier-modification option to the first user after a predetermined length of time has elapsed during the interaction. The predetermined length of time may include, a parameter set by the first user and/or both the first user and the second user prior to the interaction. In some implementations, the user interaction module 222 modifies the second identifier associated with the first user during the interaction between the first user and the second user. The modification of the second identifier may include, updating sensitive information associated with the second identifier. In some implementations, the user interaction module 222 in cooperation with the profile server 126 and/or identifier association module 224 updates information of the first user associated with the second identifier by exchanging the second identifier with the first identifier. The user interaction module 222 in cooperation with the identifier presentation module 226 may provide the updated information of the first user based on the first identifier during the interaction. In some implementations, the user interaction module 222 may send the interaction request and the interaction-identifier to the identifier association module 224, which may then use those inputs to perform its acts and/or functionalities thereon.

The identifier association module 224 is software, code, logic, or routines for associating one or more identifiers. In some implementations, the identifier association module 224 in cooperation with the profile server 126 may determine a user and profile information associated with the user based on one or more identifiers. For instance, the identifier association module 224 may parse data store 210 and/or memory 204 for user profile information associated with one or more identifiers. In some implementations, a first identifier may be associated with a first user and an application (e.g. business application, gaming application, social-networking application, etc.). For example, a first user may register an identifier with one or more applications and the identifier association module 224 may associate the registered identifier with the one or more applications. In some implementations, the identifier association module 224 may associate the registered identifier of the first user responsive to receiving an interaction request from a second user, the interaction request including an interaction-identifier (e.g. third identifier).

For instance, the identifier association module 224 receives an interaction request from the second user interaction module 222, and then associates an interaction-identifier (e.g. third identifier) associated with the interaction request and the first user, to one or more identifiers stored in the data store 210 and/or memory 204. In some implementations, the identifier association module 224 maps the interaction-identifier with an online gaming application, and the identifier association module 224 in cooperation with the third party application 132 may associate the interaction-identifier (e.g. third identifier) with a gaming profile associated with a user on the gaming application.

In some implementations, the identifier association module 224 receives an interaction request from the user interaction module 222; the interaction request may be associated with an interaction-identifier (e.g. third identifier) from a user. The interaction-identifier (e.g. third identifier) may be associated with a first user and an application. An interaction-identifier (e.g. third identifier) may reference a phone number and/or e-mail address. In some implementations, a second user may submit a search to a search engine, the search may include the interaction-identifier (e.g., third identifier, phone number) associated with the first user. The search engine (not shown) in cooperation with the identifier association module 224 may then provide a search result that displays one or more users associated with the interaction-identifier and one or more applications to the second user. A search result, may include, but is not limited to, one or more applications indicating reachability of the first user.

The identifier association module 224, in some implementations, determines a type for a user that initiates an interaction request. For instance, the identifier association module 224 in cooperation with the profile server and/or third party server 130 can determine whether a type of a first user associated with an interaction request matches a type of a second user. In some implementations, the identifier association module 224 in cooperation with the profile server 126, retrieves profiles of the first user and the second user and correlates the profiles between the first user and the second user, based on the correlation of the profiles, the identifier association module 224 determines that a type match exists between the first user and the second user. The identifier association module 224 may then transmits the type match to the identifier presentation module 226 to perform its acts and/or functionalities thereon.

The identifier presentation module 226 is software, code, logic, or routines for presenting information associated with one or more identifiers. In some implementations, the identifier presentation module 226 provides for display to the second user information of the first user. In some implementations, the information associated with the first user being provided to the second user can be based on the second identifier. The second identifier may reference the subset of information (e.g. limited information) associated with the first user.

In some implementations, the identifier presentation module 226 receives a modified identifier associated with a present interaction between the first user and the second user. The modified identifier may reference or include updated sensitive information associated with a first identifier of the first user. In some implementations, the presentation module 226 provides the updated sensitive information for display to the second user during the present interaction.

The processor 202 may execute software instructions by performing various inputs, logical, and/or mathematical operations. The processor 202 may have various computing architectures to method data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device, supporting the display of images, capturing and transmitting images, performing complex tasks including various types of feature extraction and sampling, etc. In some implementations, the processor 202 may be coupled to the memory 204 via the bus 206 to access data and instructions therefrom and store data therein. The bus 206 may couple the processor 202 to the other components of the application server 120 including, for example, the memory 204, the communication unit 208, and the data store 210.

The memory 204 may store and provide access to data to the other components of the application server 120. In some implementations, the memory 204 may store instructions and/or data that may be executed by the processor 202. The memory 204 is also capable of storing other instructions and data, including, for example, an operating system, hardware drivers, other software applications, databases, etc. The memory 204 may be coupled to the bus 206 for communication with the processor 202 and the other components of the application server 120.

The memory 204 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory (e.g., RAM, ROM, hard disk, optical disk, etc.). It should be understood that the memory 204 may be a single device or may include multiple types of devices and configurations.

The bus 206 may include a communication bus for transferring data between components of a computing device or between computing devices, a network bus system including the network 102 or portions thereof, a processor mesh, a combination thereof, etc. In some implementations, the application server 120 and the profile server 126 may cooperate and communicate via a software communication mechanism implemented in association with the bus 206. The software communication mechanism may include and/or facilitate, for example, inter-process communication, local function or procedure calls, remote procedure calls, network-based communication, secure communication, etc.

The communication unit 208 may include one or more interface devices for wired and wireless connectivity with the network 102 and the other entities and/or components of the system 100 including, for example, the user devices 106, the application server 120, the profile server 126, and the data store 210, etc. For instance, the communication unit 208 may include, but is not limited to, CAT-type interfaces; wireless transceivers for sending and receiving signals using Wi-Fi™; Bluetooth®, cellular communications, etc.; USB interfaces; various combinations thereof; etc. In some implementations, the communication unit 208 can link the processor 202 to the network 102, which may in turn be coupled to other processing systems. The communication unit 208 can provide other connections to the network 102 and to other entities of the system 100 using various standard communication protocols, including, for example, those discussed elsewhere herein.

The data store 210 is an information source for storing and providing access to data. In some implementations, the data store 210 may be coupled to the components 122, 202, 204, 208, 220, 222, 224, and/or 226 of the application engine 122 via the bus 206 to receive and provide access to data. In some implementations, the data store 210 may store data received from the other entities 106, 120, and/or 126 of the system 100, and provide data access to these entities. The data store 210 may include one or more non-transitory computer-readable mediums for storing the data. In some implementations, the data store 210 may be incorporated with the memory 204 or may be distinct therefrom. In some implementations, the data store 210 may include a database management system (DBMS). For example, the DBMS could include a structured query language (SQL) DBMS, a NoSQL DMBS, various combinations thereof, etc. In some implementations, the DBMS may store data in multi-dimensional tables comprised of rows and columns, and manipulate, e.g., insert, query, update and/or delete, rows of data using programmatic operations.

Figure 3:
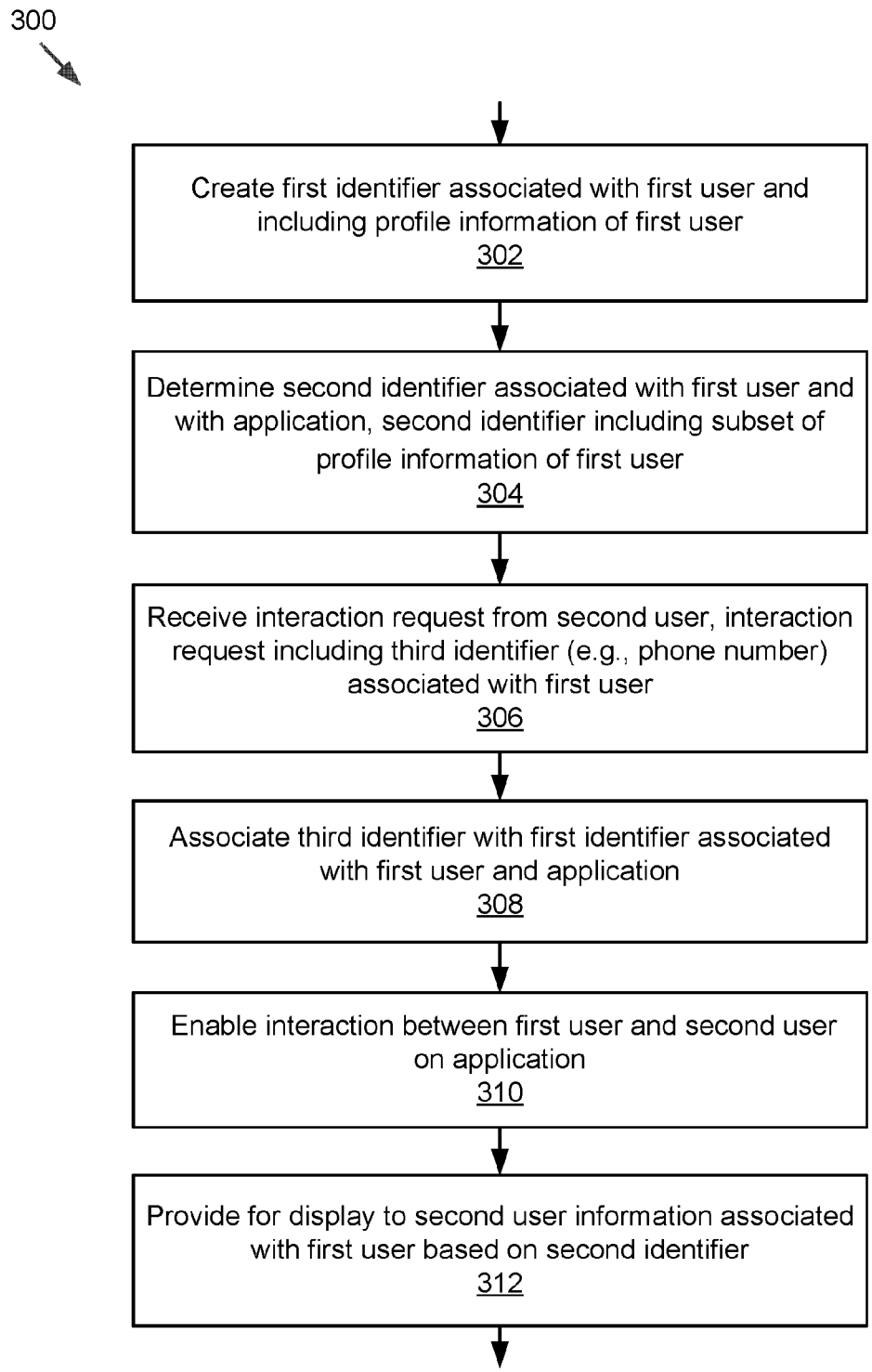
FIG. 3 is a flowchart of an example method for providing limited user information.

FIG. 3 is a flowchart of an example method for providing limited user information. The method 300 begins by creating 302 a first identifier associated with a first user. In some implementations, the identifier determination module 220 creates a first identifier responsive to receiving an identifier registration request from a user. The registration request may include, registering a first identifier with a profile of the first user. For example, the first identifier may reference or include information associated with a profile of the first user associated with a gaming application. The profile of the first user may also, be associated with a social network profile, a business profile, an on-line gaming profile, etc. In some implementations, the operations in step 302 may be performed by the identifier determination module 220 in cooperation with one or more other entities of the system 100.

Next, the method 300 continues by determining 304 a second identifier. In some implementations, the identifier determination module 220 may receive a second identifier registration request for creating a second identifier. The second identifier may be associated with a profile of the first user and with an application (e.g. online gaming application, multimedia applications, social networking applications, etc.). The second identifier, in some implementations, may reference or include a subset of information associated with the profile of the first user. In some implementations, the profile server 126 retrieves a profile of the first user and assigns a subset of information associated with a profile of the first user based on requirements of the second identifier.

A subset of information associated with a profile of the first user may include, but is not limited to, demographic information (e.g. age, race, sex, economic status, level of education, etc.) For example, in some implementations, a user may indicate that certain personal information associated with the profile of the first user be only shared with other users external to a personal network of the first user, by means of the second identifier. In some implementations, the operations in step 304 may be performed by the identifier determination module 220 in cooperation with the profile server 126.

The method 300 continues by receiving 306 an interaction request from a second user. The interaction request may include a third identifier associated with the first user. For instance, the second user may search using a third identifier associated with the first user in an application, and responsive to a search result the second user may request an interaction with the first user on the application. A third identifier may reference or include a phone number, e-mail address, alias associated with the first user for one or more applications. In some implementations, the operations performed in step 306 may be performed by the user interaction module 222 in cooperation with the identifier association module 224.

The method 300 may then continue by associating 308 the third identifier with the first identifier. In some implementations, the identifier association module 224 may associate a third identifier with a first identifier of a first user and an application associated with the first identifier. For instance, the identifier association module 224 can associate the third identifier with an online gaming application, and the identifier association module 224 in cooperation with the third party application 132 and/or the profile server 126, may determine a gaming profile associated with the first user based on the first identifier and/or the third identifier. In some implementations, the operations performed in step 308 may be performed by the identifier association module 224 in cooperation with the third party server 130 and/or the profile server 126.

Next, the method 300 may enable 310 the interaction between the first user and the second user. In some implementations, the user interaction module 222 enables an interaction between the first user and the second user responsive to receiving an authorization from the first user. The authorization of the first user may be indicative that the first user desires to interact with the second user. In some implementations, the interaction between the first user and the second user can be on an application. The third party application 132 in cooperation with the application engine 122 can host and process the application hosting the interaction between the first user and the second user. In some implementations, the operations performed in step 310 may be performed by the identifier association module 224 as discussed elsewhere herein.

The method 300 may continue by providing 312 for display to the second user information of the first user. In some implementations, the information associated with the first user being provided to the second user can be based on the second identifier. The second identifier may reference the subset of information (e.g. limited information) associated with the first user. For example, the first user may indicate that certain personal information associated with the profile of the first user be only shared with other users by means of the second identifier. In some implementations, the operations in step 312 may be performed by the identifier association module 224 in cooperation with the identifier presentation module 226.

Figure 4:
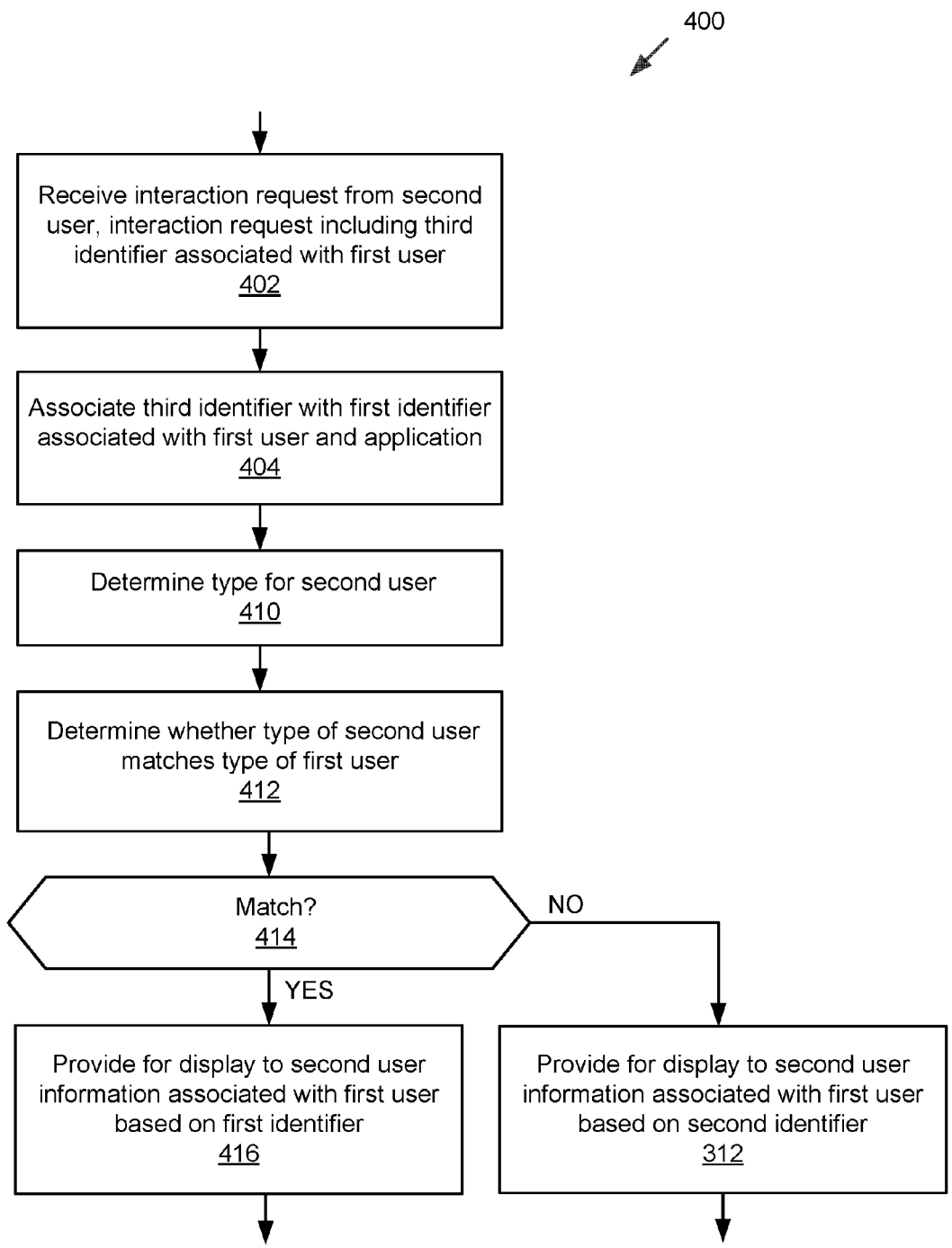
FIG. 4 is a flowchart of an example method for providing limited user information based on user type match.

FIG. 4 is a flowchart of an example method for providing limited user information based on user type match. The method 400 begins by receiving 402 an interaction request from a second user. In some implementations, the interaction request may include a third identifier associated with a first user. The third identifier may reference a phone number and/or e-mail associated with the first user. The third identifier, in some implementations, may be associated with an application and a first user. In some implementations, the operations performed in step 402 may be performed by the user interaction module 222.

Next, the method 400 may continue by associating 404 the third identifier with a first identifier. In some implementations, the first identifier may be associated with a first user and an application (e.g. business application, gaming application, social-networking application, etc.). For instances, a first user may register an identifier with one or more applications and the identifier association module 224 may associate the registered identifier with the one or more applications responsive to receiving an interaction request from a second user, the interaction request including a third identifier. In some implementations, the operations performed in step 404 may be performed by the identifier association module 224.

The method 400 may then continue by determining 410 a type for the second user. The type for the second user can be determined by the application server 120 in cooperation with the profile server 126. In some implementations, the identifier association module 224 receives profile information associated with the second user from the profile server 126; the identifier association module 224 then determines the type for the second user based on the profile information.

In further implementations, the identifier association module 224 determines a type for the second user using an interaction identifier associated with the interaction request, and parses the data store 210 and retrieves information associated with the second user based on the interaction identifier. The parser type for steps that perform parsing could be done using a bottom-up parsing, a CYK algorithm, a GLR parser, a LALR parser, a shift-reduce parser, or other parsing techniques in different implementations. The interaction identifier may reference or include information specific to the second user, for example, but is not limited to, identification information associated with the client device of the second user that sent the interaction request, etc. A non-limiting example, for a type of the second user may include, an age, a geographic location, a profile photo, a phone number, work information, education, friends of the second user, browsed content, registered applications, groups joined by the second user, etc.

Next, the method 400 may continue by determining 412 whether the type of the second user matches a type of the first user. For instance, the identifier association module 224 can parse data store 210 to retrieve type information associated with the first user and the second user based on the third identifier of the first user and an interaction identifier associated with the second user. The method 400 may then determine if the type information matches 414 between the first user and the second user. In some implementations, a matching algorithm performing matching can be done using a string-matching algorithm, an exact string-matching algorithm, a string comparison of exact types, or other commonly used matching algorithms. In some implementations, the identifier association module 224 in cooperation with the profile server 126, retrieves profiles of the first user and the second user and correlates the profiles between the first user and the second user, based on the correlation of the profiles, the identifier association module 224 determines that a type match exists between the first user and the second user. The correlation of the profiles may include an association between demographic information of the first user and the second user.

If a match exists, the method 400 may continue by providing 416 for display to the second user information associated with the first user. In some implementations, the information associated with the first user may be provided based on a fourth identifier. For instance, the first user may have specified during an identifier registration operation that other users that are similar or match in type may be displayed personal information, while other users that do not match in type with the first user would not have the personal information displayed to them via the fourth identifier.

If a match does not exist, the method 400 may continue by providing 312 for display to the second user information associated with the first user based on a second identifier. The second identifier may reference or include a subset of information (e.g. limited information) about the first user. In some implementations, the operations performed in steps 414, 416, and 312 may be performed by the identifier presentation module 226 in cooperation with the user interaction module 222 and identifier association module 224 and/or any other components of the system 100.

Figure 5:
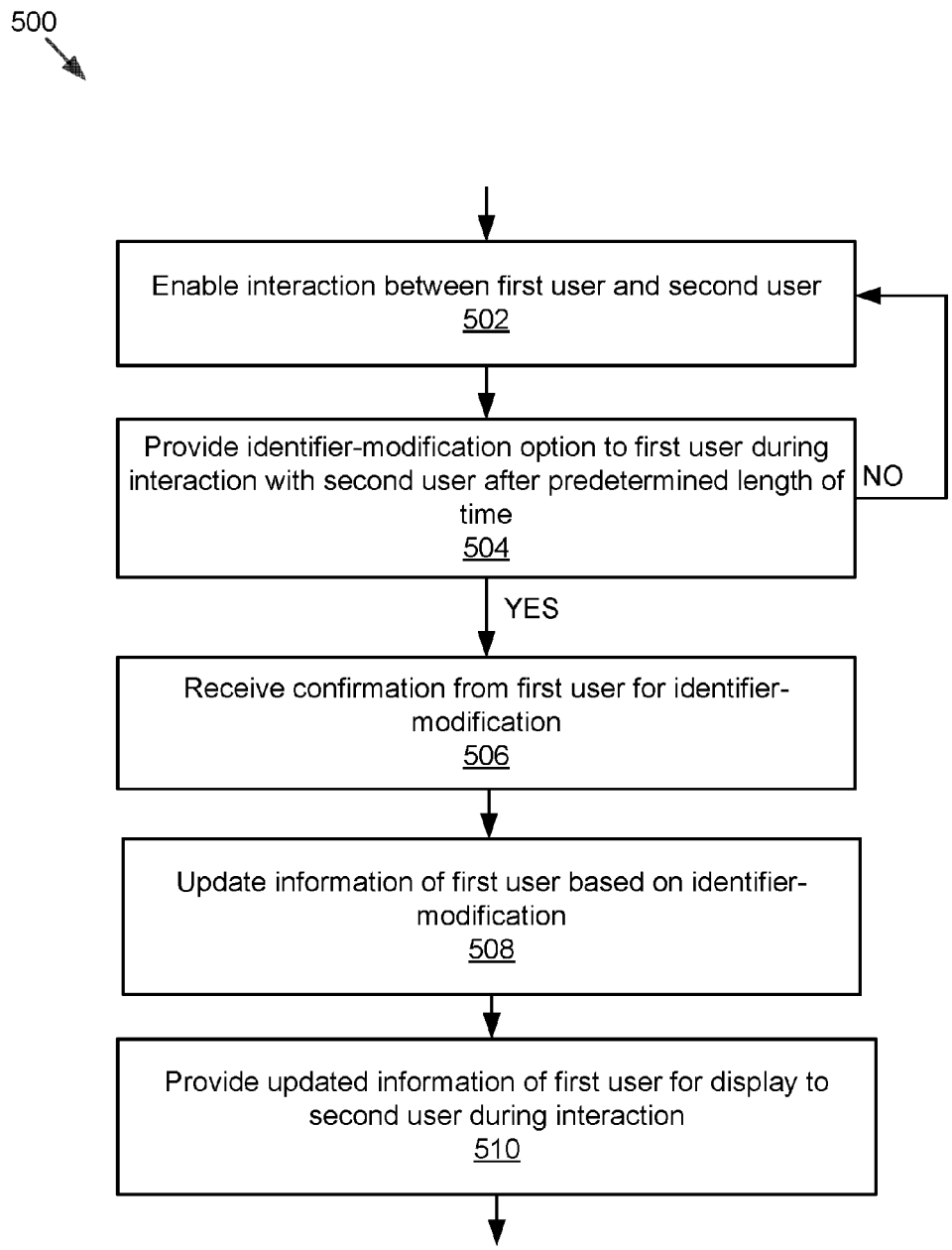
FIG. 5 is a flowchart of an example method for providing updated limited user information.

FIG. 5 is a flowchart of an example method for providing updated limited user information. The method 500 begins by enabling 502 an interaction between a first user and a second user. In some implementations, the user interaction module 222 processes an interaction between a first user and a second user, and determines a pending interaction period. A pending interaction period may include, but is not limited to, an ongoing time-lapse. In some implementations, the interaction period between the first user and the second user may be specific to an application. An interaction period associated with an application, may include, an average overall duration for an interaction between the first user and another user. In some implementations, the interaction period associated with the interaction may be determined by the user interaction module 222 and/or any other components of the application engine 122.

Next, the method 500 may continue by providing 504 an identifier-modification option to the first user during an interaction with the second user. In some implementations, the user interaction module 222 provides an identifier-modification option to the first user after a predetermined length of time. The predetermined length of time may be a parameter set by the first user. In some implementations, the predetermined length of time may include the average overall duration associated with an interaction between a first user and a second user external to a personal network of the first user.

The method 500 may then continue to determine if the predetermined length of time has been reached. If the predetermined length of time has not been satisfied, the method 500 may return to step 502. If the predetermined length of time has been satisfied, the method 500 may continue by receiving 506 a confirmation from the first user for the identifier-modification. For instance, the user interaction module 222 may receive an authorization from the first user for modifying an identifier associated with a current interaction between the first user and the second user, responsive to the user interaction module 222 providing an identifier-modification option to the first user. In some implementations, the predetermined length of time may be indicative that the first user had enough time to determine if the second user should be displayed personal information instead of limited information of the first user. For instance, during an interaction between the first user and the second user, the second user may be provided with limited information (e.g. name and age only); however, after a predetermined length of time the first user may then be prompted to modify the identifier providing the limited information to the second user. In some implementations, the operations performed in steps 506 may be performed by the identifier presentation module 226 in cooperation with one or more other entities of the system 100.

Next, the method 500 may continue by updating 508 information of the first user based on the identifier-modification. In some implementations, the user interaction module 222 in cooperation with the profile server 126 and/or identifier association module 224 can update information of the first user by substituting a limited identifier with a personal identifier. The limited identifier may reference a subset of information associated with a profile of the first user, while the personal identifier may reference complete information (e.g. complete demographic information) associated with the profile of the first user.

The method 500 may then continue by providing 510 updated information of the first user for display to the second user during the interaction. In some implementations, the updated information associated with the first user may be based on a first identifier. For instance, during a first portion of the interaction between the first user and the second user, the second user may be provided limited information (e.g. a subset of information of a profile of the first user) associated with the first user based on a second identifier, after the update the second user may then be provided non-limiting information associated with the first user based on the first identifier. The non-limiting information may include information of the first user such as, but is not limited to: age, geographic location, profile photo, phone number, work information, education, and friends of the first user. In some implementations, the operations performed in steps 510 may be performed by the identifier association module 224 in cooperation with one or more other components of the system 100.

The systems and methods described above provide distinct advantages to specific technologies. For example, in some implementations a user is able to limit access to portions of their profile information and increase their privacy over the internet, while still allowing the user to be contacted by other users. The issue of privacy in communications and/or interactions using the internet is a computer-centric issue to which the systems and methods described in this disclosure provide solutions. In some implementations, the systems and methods disclosed provide improvements to the specific technologies that facilitates user interactions and/or communications over the internet. For example, a user may choose using these methods to allow other users to interact with them through a phone (or other network device), but in the context of a game or other application, the user may be able to limit other users from interacting with them through the game or other application. Specifically, the systems and methods provide a granular control for reachability. In some implementations, the systems and methods disclosed improve the identifier determination module 220 (or other modules performing similar functions) by having the identifier determination module 220 create multiple account identifiers for the user to have separate reachable statuses and these multiple account identifiers may be unique to applications.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method for protecting and controlling access to private personal information, the method comprising:

creating, using one or more computing devices, a first identifier associated with a first user and referencing profile information of the first user;

generating a list of applications indicating reachability of the first user based on the first identifier;

determining, using the one or more computing devices, a second identifier associated with the first user and with an application in the list of applications, the second identifier referencing a subset of the profile information of the first user;

receiving, using the one or more computing devices, an interaction request from a second user, the interaction request including a third identifier associated with the first user;

associating, using the one or more computing devices, the third identifier with the first identifier of the first user and with the application in the list of applications indicating reachability of the first user based on the first identifier;

responsive to associating the third identifier with the first identifier and with the application, enabling, using the one or more computing devices, an interaction between the first user and the second user on the application; and providing, using the one or more computing devices, for display to the second user information associated with the first user based on the second identifier.

2. The method of claim 1, wherein the first identifier references a phone number associated with the first user.

3. The method of claim 1, wherein the information associated with the first user is displayed to the second user during an interaction session with the first user.

4. The method of claim 1, wherein the information associated with the first user may include one from the group of an age, a geographical location, a profile photo, a phone number, a work information, an education, a friend of the first user, a browsed content, a registered application, and a group joined by the first user.

5. The method of claim 1, further comprising:
determining, using the one or more computing devices, a type of the second user;
determining, using the one or more computing devices, whether the type of the second user matches a type of the first user; and
responsive to the type of the second user matching the type of the first user, providing for display, using the one or more computing devices, to the second user the information associated with the first user based on a fourth identifier.

6. The method of claim 5, wherein the fourth identifier references an alias associated with a group associated with the first user.

7. The method of claim 1, further comprising:
providing, using the one or more computing devices, an identifier-modification option to the first user during the interaction with the second user after a predetermined length of time;
receiving, using the one or more computing devices, a confirmation from the first user for the identifier-modification option;
responsive to receiving the confirmation, updating, using the one or more computing devices, the information associated with the first user based on the identifier-modification option; and
providing, using the one or more computing devices, the updated information associated with the first user for display to the second user during the interaction.

8. The method of claim 1, further comprising:
providing, using the one or more computing devices, for display to the second user the list of applications indicating reachability of the first user, the list of applications including a limited display of information associated with the first user based on the second identifier.

9. A computer program product comprising a non-transitory computer usable medium including a computer readable program, wherein the computer readable program when executed on a computer causes the computer to:
create a first identifier associated with a first user and referencing profile information of the first user;
generate a list of applications indicating reachability of the first user based on the first identifier;
determine a second identifier associated with the first user and with an application in the list of applications, the second identifier referencing a subset of the profile information of the first user;
receive an interaction request from a second user, the interaction request including a third identifier associated with the first user;
associate the third identifier with the first identifier of the first user and with the application in the list of applications indicating reachability of the first user based on the first identifier;
responsive to associating the third identifier with the first identifier and with the application, enable an interaction between the first user and the second user on the application; and
provide for display to the second user information associated with the first user based on the second identifier.

10. The computer program product of claim 9, wherein the first identifier references a phone number associated with the first user.

11. The computer program product of claim 9, wherein the information associated with the first user is displayed to the second user during an interaction session with the first user.

12. The computer program product of claim 9, wherein the information associated with the first user may include one from the group of an age, a geographical location, a profile photo, a phone number, a work information, an education, a friend of the first user, a browsed content, a registered application, and a group joined by the first user.

13. The computer program product of claim 9, wherein the computer readable program when executed on a computer also causes the computer to:
determine a type of the second user;
determine whether the type of the second user matches a type of the first user; and
responsive to the type of the second user matching the type of the first user, provide for display to the second user the information associated with the first user based on a fourth identifier.

14. The computer program product of claim 9, wherein the fourth identifier references an alias associated with a group associated with the first user.

15. The computer program product of claim 9, wherein the computer readable program when executed on a computer also causes the computer to:
provide an identifier-modification option to the first user during the interaction with the second user after a predetermined length of time;
receive a confirmation from the first user for the identifier-modification option;
responsive to receiving the confirmation, update the information associated with the first user based on the identifier-modification option; and
provide the updated information associated with the first user for display to the second user during the interaction.

16. The computer program product of claim 9, wherein the computer readable program when executed on a computer also causes the computer to:
provide for display to the second user the list of applications indicating reachability of the first user, the list of applications including a limited display of information associated with the first user based on the second identifier.

17. A system comprising:
a processor; and
a memory storing instructions that, when executed, cause the system to:
create a first identifier associated with a first user and referencing profile information of the first user;
generate a list of applications indicating reachability of the first user based on the first identifier;
determine a second identifier associated with the first user and with an application in the list applications, the second identifier referencing a subset of the profile information of the first user;

receive an interaction request from a second user, the interaction request including a third identifier associated with the first user;

associate the third identifier with the first identifier of the first user and with the application in the list of applications indicating reachability of the first user based on the first identifier;

responsive to associating the third identifier with the first identifier and with the application, enable an interaction between the first user and the second user on the application; and provide for display to the second user information associated with the first user based on the second identifier.

18. The system of claim 17, wherein the first identifier references a phone number associated with the first user.

19. The system of claim 17, wherein the information associated with the first user is displayed to the second user during an interaction session with the first user.

20. The system of claim 17, wherein the information associated with the first user may include one from the group of an age, a geographical location, a profile photo, a phone number, a work information, an education, a friend of the first user, a browsed content, a registered application, and a group joined by the first user.

* * * * *